US012522095B2

(12) United States Patent
Van Der Weijde et al.

(10) Patent No.: US 12,522,095 B2
(45) Date of Patent: Jan. 13, 2026

(54) DEVICE FOR POSITIONING A CHARGER CONNECTOR (71) Applicant: ROCSYS B.V, Rijswijk (NL)

(72) Inventors: Johannes Oosten Van Der Weijde, Rijswijk (NL); Guus Nico Paris, Rijswijk (NL); Crijn Bouman, Rijswijk (NL)

(73) Assignee: ROCSYS B.V., Rijswijk (NL)

( * ) Notice: Subject to any disclaimer, the term of this patent is extended or adjusted under 35 U.S.C. 154(b) by 591 days.

(21) Appl. No.: 18/013,007

(22) PCT Filed: Jun. 30, 2021

(86) PCT No.: PCT/NL2021/050410
§ 371 (c)(1),
(2) Date: Dec. 27, 2022

(87) PCT Pub. No.: WO2022/005281
PCT Pub. Date: Jan. 6, 2022

(65) Prior Publication Data
US 2023/0234463 A1 Jul. 27, 2023

(30) Foreign Application Priority Data
Jun. 30, 2020 (NL) .................................... 2025959

(51) Int. Cl.
*H02J 7/00* (2006.01)
*B60L 53/16* (2019.01)
(Continued)

(52) U.S. Cl.
CPC ............... *B60L 53/37* (2019.02); *B60L 53/16* (2019.02); *B60L 53/18* (2019.02)

(58) Field of Classification Search
CPC .......... B60L 53/34; B60L 53/35; B60L 53/37; B60L 53/38; B60L 53/16; B60L 53/18
(Continued)

(56) References Cited

U.S. PATENT DOCUMENTS 5,306,999 A * 4/1994 Hoffman ................. B60L 53/16
320/109
6,157,162 A * 12/2000 Hayashi ................ H02J 7/0042
320/104
(Continued)

FOREIGN PATENT DOCUMENTS

| CN | 107719181 A | 2/2018 |
| DE | 102017217601 A1 | 4/2019 |
| DE | 102016014463 A1 | 6/2020 |

OTHER PUBLICATIONS

International Search Report dated Sep. 30, 2021, Application No. PCT/NL2021/050410.

*Primary Examiner* — Alexis B Pacheco
(74) *Attorney, Agent, or Firm* — The Dobrusin Law Firm, P.C.

(57) ABSTRACT

The present invention relates to a device for positioning a charger connector, in particular relative to a vehicle contra connector, comprising a suspension for a charging cable assembly, connected at one end to the charger connector, the suspension comprising a first suspension point, for clamping, at a point remote from the one end, the charging cable assembly in a predetermined orientation and position, which orientation and position together with the rigidity of the cable assembly and the gravity acting on the cable assembly define a preferred position and/or a preferred orientation of the one end; and a second suspension point, for engaging the charging cable assembly at the one end of the charger connector; Wherein the second suspension point comprises a manipulator for manipulating the position and/or the (Continued)

orientation of the charger connector relative to the fixed world, in a range around the preferred position and/or the preferred orientation of the one end of the cable assembly.

16 Claims, 4 Drawing Sheets

(51) Int. Cl.
  *B60L 53/18* (2019.01)
  *B60L 53/37* (2019.01)
  *H02J 7/14* (2006.01)
(58) Field of Classification Search
  USPC .................................................. 320/134, 132
  See application file for complete search history.

(56) References Cited

U.S. PATENT DOCUMENTS

| | | | |
|---|---|---|---|
| 7,999,506 B1* | 8/2011 | Hollar | B60L 53/34 |
| | | | 320/109 |
| 9,056,555 B1* | 6/2015 | Zhou | B60L 53/35 |
| 10,562,432 B2* | 2/2020 | Chelian | B60P 1/5404 |
| 2015/0042278 A1* | 2/2015 | Leary | B60L 1/02 |
| | | | 901/30 |
| 2015/0210174 A1* | 7/2015 | Settele | B60L 53/35 |
| | | | 320/109 |
| 2017/0252922 A1* | 9/2017 | Levine | B25J 9/1612 |
| 2017/0270805 A1 | 9/2017 | Parker et al. | |
| 2018/0215043 A1* | 8/2018 | Michalakis | B25J 5/007 |
| 2020/0031248 A1* | 1/2020 | Kwak | G05D 1/0231 |
| 2020/0130188 A1* | 4/2020 | Lawrence | G01S 7/4972 |
| 2020/0353833 A1* | 11/2020 | Kim | H02J 7/0045 |

\* cited by examiner

DEVICE FOR POSITIONING A CHARGER CONNECTOR

The present invention relates to a device for positioning a charger connector, in particular relative to a vehicle contra connector.

Electric vehicles still gain popularity. Previous alleged drawbacks, such as a lack of charge points, seem to have been overcome, not in the least due to the fact that installing a charge point at home or in an office environment has come within reach of many in a short period of time. With a growing amount of people accustomed to electric charging of cars, there is also room for further simplification of the charging process for the user. One of the directions of simplification is the automatic connection and disconnection of the electrical connectors of the vehicle and the charger. For trucks and buses it is known to use large contact surfaces on or under the vehicle and/or systems that include the use of a pantograph. For passenger cars and also for other applications where manual coupling must also remain possible, the known solutions are not or not conveniently applicable. For example, because it is not convenient or feasible for the passenger cars to implement them with large contact surfaces or a pantograph, on the other hand, because in many cases it is desirable to keep the chargers compact and simple.

Attempts to have an automatic solution remain close to the manual process of plugging in and connecting a conventional charger connector to a vehicle contra connector are hampered by several aspects. Inserting a standard charging connector into a standard vehicle contra connector is a task of high precision. The high charging currents that are required with a nowadays more and more common DC charger to charge a vehicle result in heavy and stiff cables, while it is still required to connect and disconnect the connector with the necessary precision, caution and security. The combination of a required accuracy and considerable forces and moments for manoeuvring the charging cable makes automating this operation a challenge, especially when additional requirements on the speed of the process are imposed.

It is a goal of the present invention to provide a solution for automating the connection of a charger connector to a vehicle contra connector of an electric vehicle, or at least to take away at least one of the disadvantages of the prior art. The invention thereto proposes a device for positioning a charger connector, in particular relative to a vehicle contra connector, comprising a charging cable assembly and a suspension for a charging cable assembly, connected at one end to the charger connector, the suspension comprising a first suspension point, for clamping, at a point remote from the one end, the charging cable assembly in a predetermined orientation and position, which orientation together with the rigidity of the cable assembly and the gravity acting on the cable assembly have a preferred position and/or defines a preferred orientation of the one end; and a second suspension point, for engaging the charging cable assembly at the one end of the charger connector, wherein the second suspension point comprises a manipulator for manipulating the position and/or the orientation of the charger connector relative to the fixed world, in a range around the preferred position and/or the preferred orientation of the one end of the cable assembly.

CN 107719181A, US2017270805A1, DE 102016014463A1, DE 102017217601A1 and US 2020031248A1 are all examples of devices wherein the charging cable assembly are held in a predetermined orientation and position, but these orientations do not together with the rigidity of the cable assembly and the gravity acting on the cable assembly have a preferred position and/or orientation of the one end wherein it is held by the second suspension point. On the contrary, if the second suspension point were taken away, the one end would fall on the ground in all of these examples.

A cable assembly according to the invention, may comprise multiple cables, that may be joined together, possibly as one cable or in one common outer housing, sleeve or the like. It may in general be suitable to meet (DC) standards, with a maximum charging current of at least 40 Ampere, but preferably at least 100 Ampere and more preferably at least 200 Ampere, and/or charge power up to at least 45 kW. The assembly may also comprise liquid cooling facilities, that allow currents up to 300 Ampere, and even 500 Ampere or significantly above 500A for cables used in special vehicle applications.

Examples of suitable cables are Phoenix contact CCS-2, DC cable, 125A rating, Phoenix contact CCS-2, DC cable, 200A rating, Phoenix contact CCS-2, HPC, liquid cooled DC cable, 500A rating, Phoenix contact CCS-1, HPC, liquid cooled DC cable, 500A rating, Huber & Suhne CCS-2 HPC, liquid cooled DC cable, 500A rating, Huber & Suhne CCS-1 HPC, liquid cooled DC cable, 500A rating, Phoenix contact GB/T, DC cable, 80A rating, Phoenix contact GB/T, DC cable, 250A rating, Anderson Power products, Euro-Din, 320A cable for battery powered industrial trucks.

Possible connectors that can be applied are for example CCS-1, CCS-2, GB/T, CHAdeMO, ChaoJi, HPCCV, and Euro-DIN.

It may be any cable and/or plug according to standards IEC 62893 (Charging cables for electric vehicles), IEC 62196 (Plugs, socket-outlets, vehicle connectors and vehicle inlets), IEC TS 62196-3-1 CD (DC charging vehicle coupler and cable assembly with thermal management systems), IEC 61851-23 (Electric vehicle conductive charging system- DC electric vehicle charging station), GB/T (Chinese plug standard), DIN 43589 (Connector for battery powered industrial trucks 80, 160, 320 A), UL 62 (USA, UL standard for safety of flexible cords and cables, Electric vehicle cables), and UL 2251 (USA, UL standard for safety plugs, receptacles, and couplers for electric vehicles).

Cables and/or connectors may be commercially available from Huber+Suhne, Phoenix contact, Anderson Power Products, Amphenol, Yazaki, REMA, Leoni, ITT-Canon or other parties.

The preferred position and/or preferred orientation as mentioned above may be a statically balanced (equilibrium) or an unbalanced position and orientation, when the manipulator is not engaged. In the unbalanced case, the manipulator may only have to apply small forces and/or moments to balance the one end and/or the connector. Small is to be understood in this context as a fraction of the effects of the weight and dimensions of the cable between the attachment points.

A static balance may result from the rigidity/stiffness of the cable assembly in combination with gravity, and as will be explained below with reference to specific embodiments, from a winding of the cable.

A position and orientation in the sense of the present invention may comprise a definition, preferably in all six degrees of freedom, in particular comprising a three dimensional spatial definition as well as a rotational definition. The clamping, remote from the one end, defines the forces and moments of the cable assembly at the one end, when putting the one end in certain position and orientation.

In the preferred position and orientation, the charging cable of the charging cable assembly does not or not essentially extend in a vertical downward direction in or at the height of the second suspension point, and/or the second suspension point is not at or below ground level. In the preferred position, the one end remains stable and above ground level when the second suspension point were taken away, or when the second suspension point applies a fraction of the forces and/or moments that are required to hold the cable in another non-preferred but functional position without applying this invention. In other words, configurations wherein if the second suspension point were taken away, or wherein the second suspension point applies small forces, that result in the cable hanging essentially in the direction of gravity and/or the second suspension point lying on the ground are not what the invention aims at.

Preferably, in the preferred orientation the one end of the charging cable makes an angle of at least 45 degrees with a horizontal if the second suspension point were taken away.

The preferred position and/or orientation may be the position and/or orientation or be within a predefined distance from the position and orientation wherein the average force or moment required to move the one end from an equilibrium position is locally the lowest absolute force and/or moment required to keep the connector in a functional orientation. The absolute force may be the norm of the six degree of freedom force moment vector.

The one end of the cable assembly thus partly carries itself and this way compensates for gravity. As each type of cable from different manufacturers has its own stiffness properties, weight distribution properties and dimensions there can be a different clamping position and/or orientation and/or cable winding geometry for each individual cable that leads to the desired low forces and moments required to move the cable at the one end. The clamping position and/or orientation and/or cable winding geometry that works well for one cable or cable type may actually be counterproductive for another cable type. Therefore, the position of the clamp may be adjustable or configurable, or the clamp may have different geometries, accompanying the system for the different installation scenarios.

To quantify the stiffness properties of cable assemblies, a model of the cable assembly may be used. From beam theory it is known that bending stiffness B is calculated by $B = EI$ with E as the Young's modulus, and I the area moment of inertia. A charging cable assembly can be modelled by a simplified version hereof as $$B = \frac{1}{4}\pi E r^4,$$

where r is the radius of the cable assembly and E is the Young's modulus of the cable assembly. The simplification lies in assuming a solid cable with circular cross section, without differentiation between materials. These assumption do not, in any way, limit the scope of this invention.

The invention generally applies to, but is not limited to, cable assemblies with a radius larger than 8 mm, preferably larger than 10 mm, more preferably larger than 12 mm, and even more preferably larger than 14 mm. For cable assemblies with a non-circular cross section, these values may be substituted by the equivalent area moment of inertia.

The Young's modulus for a cable assembly strongly varies with the type of cable assembly. For example, a tightly packed composite cable, like Huber & Suhne CCS-2 HPC, liquid cooled DC cable, 500A rating, differs with several orders of magnitude from the loosely packed Anderson Power products, Euro-Din, 320A cable. Typically the order of magnitude for the Young's modulus of a cable assembly will be between 1 MPa and 100 GPa.

While these equations are far from a state of the art model for cable assemblies, they do give a fair approximation of the defining properties of the cable assemblies under consideration.

A manipulator in the sense of the present invention may be, but is not limited to a device as described in the Dutch patent application NL 2023019, which may be controlled in a way as described in the Dutch patent application NL 2024952, both by the same applicant, which are herein incorporated by reference.

The device according to the invention provides, by enabling to manipulate the cable assembly by exerting forces that are generally lower than those that would be required when the cable assembly was led to the manipulator in a straight line or without explicitly forcing the cable in a certain shape, the opportunity to manipulate a heavy and stiff cable with sufficient accuracy while exerting a limited force or torque. As will be explained in more detail below, this also allows to add compliance to the device.

In an embodiment of the present invention, the manipulator has a displacement stroke with a working range around a central position and/or orientation that coincides with the preferred position and/or the preferred orientation of the at least one end. A displacement stroke in the sense of the present invention may comprise linear movement, as well as a change in the orientation, and therefore explicitly also a rotational movement.

The displacement stroke may for instance comprise a ±1 m translation, ±45° rotation about radial axes and ±22.5° rotation in an axial direction. For passenger vehicles a pitch may be ±30.0°, a yaw ±25.0° and a roll ±10.0°. For industrial vehicles the values may be smaller and more equal to each other, for instance about ±12.0°.

In an alternative embodiment, the manipulator may be arranged for making a displacement stroke with a working range around a central position and/or orientation, the central position differs from the preferred position and/or the preferred orientation of the at least one end, such that the difference between the force required to manipulate the tip upward and downward is less than the difference between the force required to manipulate the one end upward and downward in the preferred position and/or orientation.

The length of the portion of the cable assembly extending between the first and second suspension point is greater than an absolute distance between the first and second suspension point. In particular it may be significantly greater, that is more than 25% or more than 33%. A larger length reduces the impact of the stiffness of the cable in general.

In a preferred embodiment, this difference is caused because the cable assembly has a winding of at least 45 degrees, more preferably at least 90 degrees, more preferably at least 180 degrees, more preferably at least 270 degrees, and even further preferably at least 360 degrees about a substantially horizontal winding axis extending substantially perpendicular to a direction from the first to the second suspension point.

Winding the cable provides the additional benefit that it may carry at least part of its own weight, that is its effective weight at the one end, as sensed by the manipulator. Here also goes that the more length between the first and second suspension point, the more flexible the cable assembly is perceived at the one end by the manipulator. A larger winding contributes to a larger flexibility. However, cable length also increases with the size of the winding. In a practical embodiment, an optimum in chosen.

The pitch of such winding is preferably at most ten times the cable thickness, more preferably at most five times the cable thickness, and further preferably between one and a half and one time the cable thickness. A larger pitch may introduce undesired torques or bias in the cable. Additionally, a radius of a winding may be between 5 and 15 times a cable assemblies thickness.

The manipulator may for instance comprise an assembly containing a kinematically serial chain of actuators and/or an assembly containing a kinematically parallel chain of actuators, and the forces (also to be understood to comprise moments in this context) required to move the one end from the preferred position and/or orientation over the entire range of the manipulator are less than a force range of the manipulator.

It yet a further preferred embodiment, the present invention comprises a compliance device, wherein the forces required to move the one end from the preferred position and/or preferred orientation over the entire range of the manipulator is less than a compliance device threshold. A compliance device, in the sense of the present invention, is to be understood as an assembly configured for resiliently and passively absorbing and releasing displacements under influence of a resultant force on the connector, after that force exceeds a threshold. When this requirement is met, the compliance is effective over a part of the range, or over the entire range, and forces exerted by the manipulator are effectively used to move the charger connector and/or the one end of the cable.

The device according to the invention may further comprise a camera for providing a camera image of a location at which a vehicle contra connector is expected, further comprising a control device for manipulating the connector, based on the camera image, to the position of a sensed vehicle contra connector.

The first suspension point may comprise a clamping device which engages the charging cable assembly over an axial distance of at least 5 cm, preferably at least 10 cm, and further preferably at least 15 cm, in a form-fitting manner.

Such a clamping device ensures that the orientation imposed on the cable assembly actually leads to the desired cable assembly orientation. The invention also explicitly relates to a clamping device of the above described kind. Additionally, the present invention relates to a device for positioning a charger connector, in particular relative to a vehicle contra connector, comprising a suspension for a charging cable assembly, connected at one end to the charger connector, the suspension comprising a first suspension point, for clamping, at a point remote from the one end, the charging cable assembly in a predetermined orientation and position, wherein the clamping device engages the charging cable assembly over an axial distance of at least 5 cm, preferably at least 10 cm, and further preferably at least 15 cm, in a form-fitting manner; and a second suspension point, for engaging the charging cable assembly at the one end of the charger connector wherein the second suspension point comprises a manipulator for manipulating the position and/or the orientation of the charger connector relative to the fixed world. Such embodiment may or may not comprise any other feature mentioned throughout this application.

In all cases, the first suspension point may comprise a clamping device which at least partly restricts and preferably completely obstructs the freedom of rotation of the charging cable assembly.

Additionally, the device according to the invention may comprise a fixing element for adjusting the stiffness of the charging cable assembly, or fixating the charging cable assembly in a certain shape. This may in general be a mechanical element which influences the stiffness and/or natural orientation of the cable, such as a guide or a spring, in a shape between the first suspension point and the second suspension point. Application of the fixing element alters the properties and/or natural shape of the cable, which in turn alters the preferred position and/or the preferred orientation and/or the forces required for manipulating the one end over the required range, such that it is more favourable.

In order to apply the present invention as a retro-fit add on to an existing charger, or to change charge cable assemblies or types, the first and/or second suspension point may be arranged for detachably engaging the charging cable assembly.

For increasing the devices flexibility and working area, the first and second suspension point may be movable together relative to the fixed world.

The invention also relates to an electric vehicle charger or charging system, comprising a device according to any of the preceding claims, a charging cable assembly, for conveying an electric charging current for the electric vehicle, connected at one end to the charger connector and at another end of the charging cable electrically coupled to at least one source, such as an electric converter, to provide a charging current for an electric vehicle.

The invention will now be elucidated into more detail with reference to the following figures. Herein.

Figure 1:
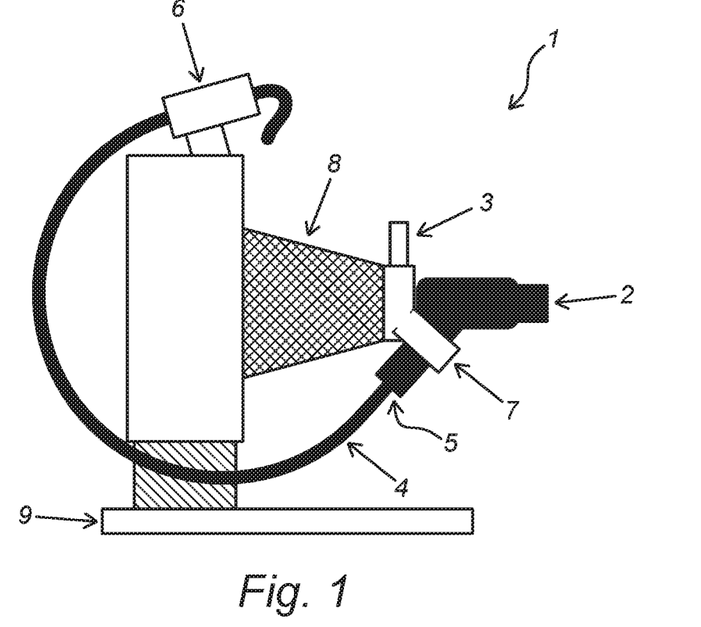
FIG. 1 shows a schematic view of a first embodiment of the present invention.

FIG. 1 shows a device 1 for positioning a charger connector 2 relative to a vehicle contra connector (not shown), comprising a suspension for a charging cable assembly 4, connected at one end 5 to the charger connector 2, the suspension comprising a first suspension point 6, for clamping, at a point remote from the one end 5, the charging cable assembly 4 in a predetermined orientation and position (as will be explained in more detail with reference to FIG. 5), which orientation and position together with the rigidity of the cable assembly 4 and the gravity acting on the cable assembly define a preferred position and/or a preferred orientation (as will be explained in more detail with reference to FIG. 5) of the one end 5, and a second suspension point 7, for engaging the charging cable assembly 4 at the one end 5 of the charger connector wherein the second suspension point 7 comprises a manipulator 8 for manipulating the position and/or the orientation of the charger connector relative to the fixed world 9, in a range around the preferred position and/or the preferred orientation (as will be explained in more detail with reference to FIG. 5) of the one end of the cable assembly 4. The device further comprises a camera 3.

Figure 2:
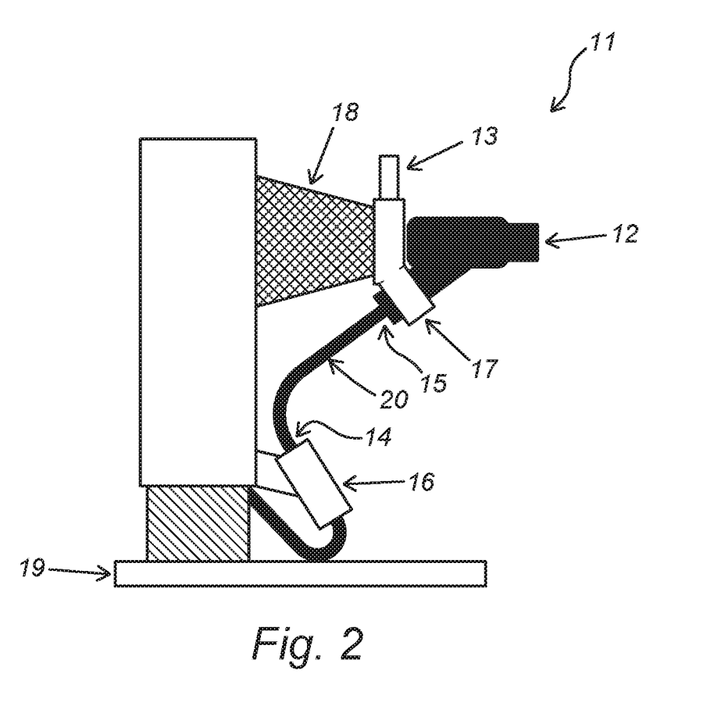
FIG. 2 shows a schematic view of a second embodiment of the present invention.

FIG. 2 shows a device 11 for positioning a charger connector 12 relative to a vehicle contra connector (not shown), comprising a suspension for a charging cable assembly 14, connected at one end 15 to the charger connector 12, the suspension comprising a first suspension point 16, for clamping, at a point remote from the one end 15, the charging cable assembly 14 in a predetermined orientation and position (as will be explained in more detail with reference to FIG. 5), which orientation and position together with the rigidity of the cable assembly 14 and the gravity acting on the cable assembly define a preferred position and/or a preferred orientation (as will be explained in more detail with reference to FIG. 5) of the one end 15, and a second suspension point 17, for engaging the charging cable assembly 14 at the one end 15 of the charger connector wherein the second suspension point 17 comprises a manipulator 18 for manipulating the position and/or the orientation of the charger connector relative to the fixed world 19, in a range around the preferred position and/or the preferred orientation (as will be explained in more detail with reference to FIG. 5) of the one end of the cable assembly 14. The cable assembly 14 has a winding 20 of about 90 degrees about a substantially horizontal winding axis (not shown) extending substantially perpendicular to a direction from the first to the second suspension point 16, 17. As a result, at its preferred position and in its preferred orientation of its one end 15, it carries at least part of its own weight. The device further comprises a camera 13.

Figure 3:
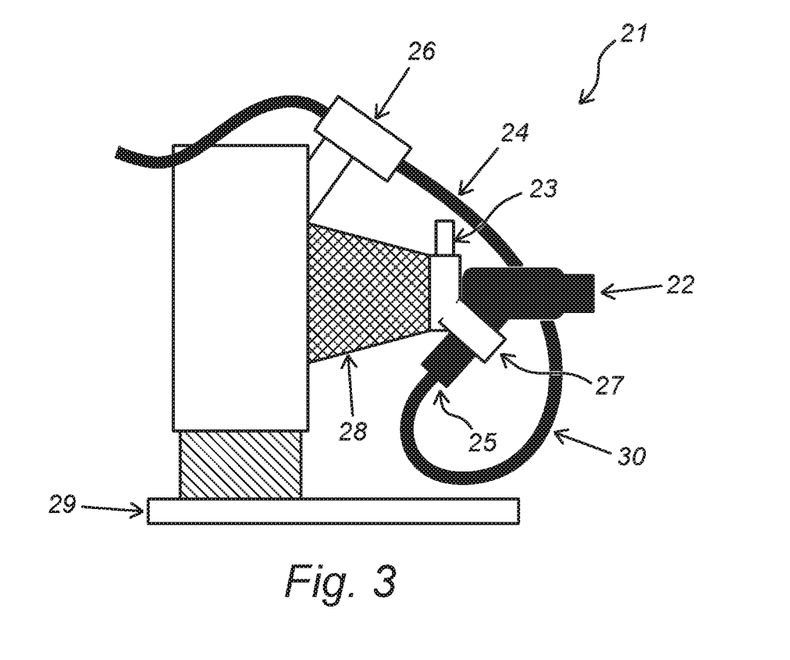
FIG. 3 shows a schematic view of a third embodiment of the present invention.

FIG. 3 shows a device 21 for positioning a charger connector 22 relative to a vehicle contra connector (not shown), comprising a suspension for a charging cable assembly 24, connected at one end 25 to the charger connector 22, the suspension comprising a first suspension point 26, for clamping, at a point remote from the one end 25, the charging cable assembly 24 in a predetermined orientation and position (as will be explained in more detail with reference to FIG. 5), which orientation and position together with the rigidity of the cable assembly 24 and the gravity acting on the cable assembly define a preferred position and/or a preferred orientation (as will be explained in more detail with reference to FIG. 5) of the one end 25, and a second suspension point 27, for engaging the charging cable assembly 24 at the one end 25 of the charger connector wherein the second suspension point 27 comprises a manipulator 28 for manipulating the position and/or the orientation of the charger connector relative to the fixed world 29, in a range around the preferred position and/or the preferred orientation (as will be explained in more detail with reference to FIG. 5) of the one end of the cable assembly 24. The cable assembly 24 has a winding 30 of about 270 degrees about a substantially horizontal winding axis (not shown) extending substantially perpendicular to a direction from the first to the second suspension point 26, 27. As a result, at its preferred position and in its preferred orientation of its one end 25, it carries at least part of its own weight. The device further comprises a camera 23.

Figure 4:
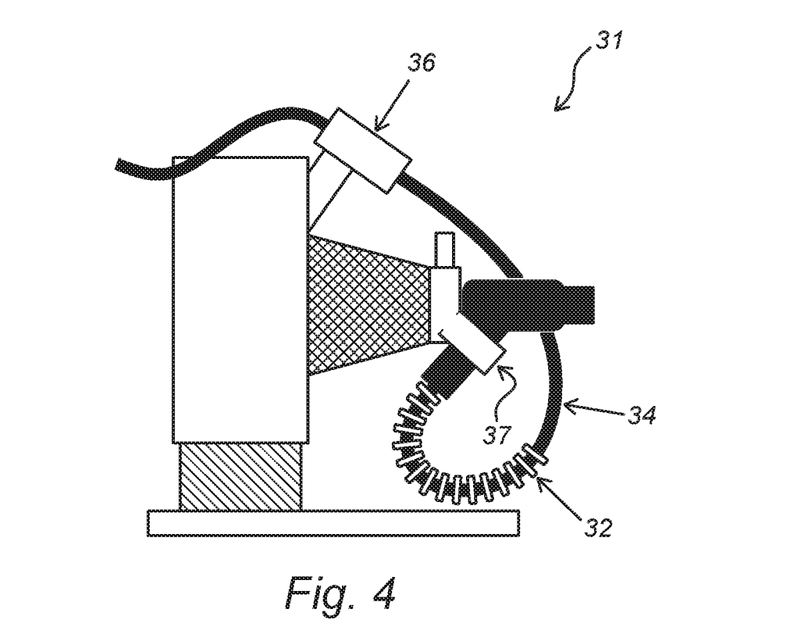
FIG. 4 shows a schematic view of a fourth embodiment of the present invention.

FIG. 4 shows an embodiment 31 of a device according to the present invention, similar to the embodiment 21 of FIG. 3, but additionally comprising a fixing element 32 formed by a spring, for adjusting the stiffness of the charging cable assembly, or fixating the charging cable assembly 34 in a certain shape, such as the U-shape shown between the first suspension point 36 and the second suspension point 37.

Figure 5:
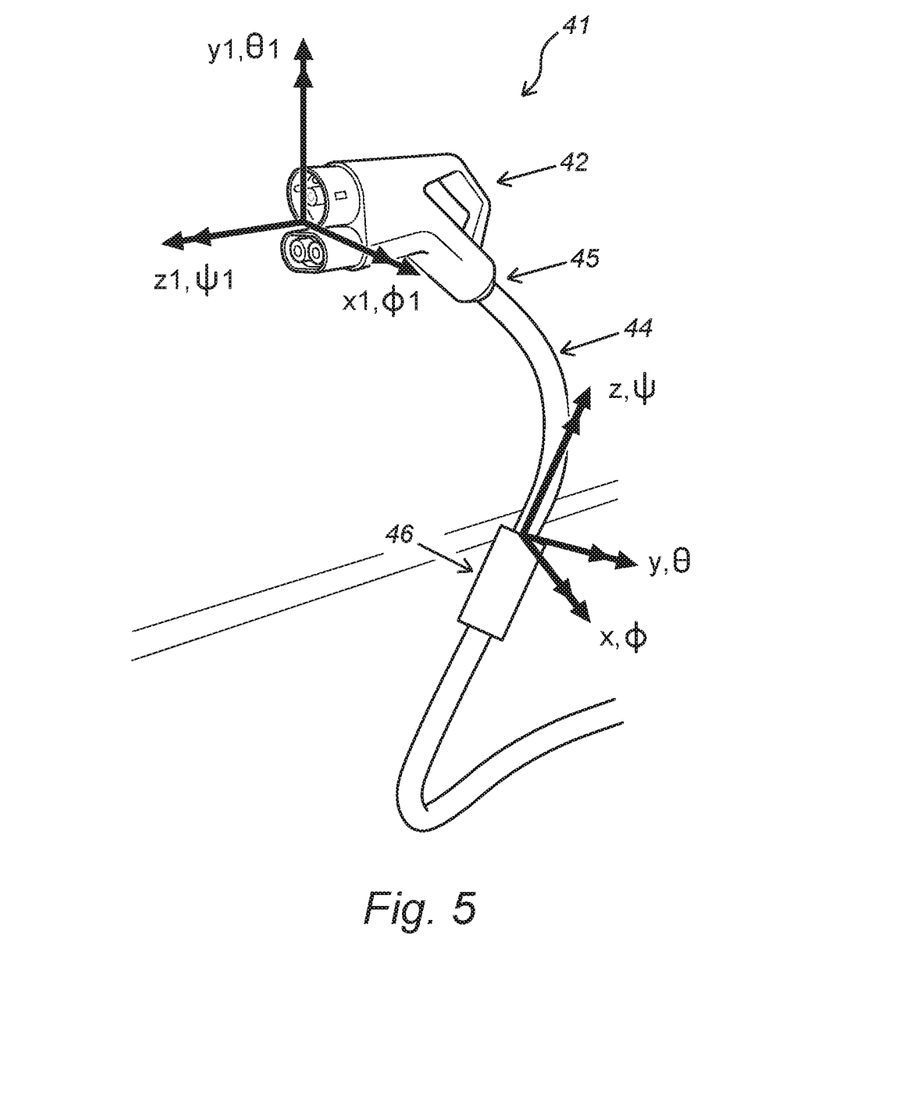
FIG. 5 shows a perspective view of a first detail of various embodiments of the present invention.

FIG. 5 shows part of an embodiment 41 according to the present invention, wherein for explanatory reasons, amongst other details, the second suspension point is left out. A first suspension point 46 is depicted, that clamps and therewith fixates the cable assembly 44 according to positions x, y, z and angles $\varphi$, $\theta$, $\psi$, defining a preferred position and angular orientation of the one end 45 and the charging connector 42 at preferred position x1, y1, z1 and preferred orientation ($\varphi$1, $\theta$1, $\psi$1. This may be the position wherein a manipulator at the second suspension point engaged the connector 42 or the one end 45 of the cable assembly.

Figure 6:
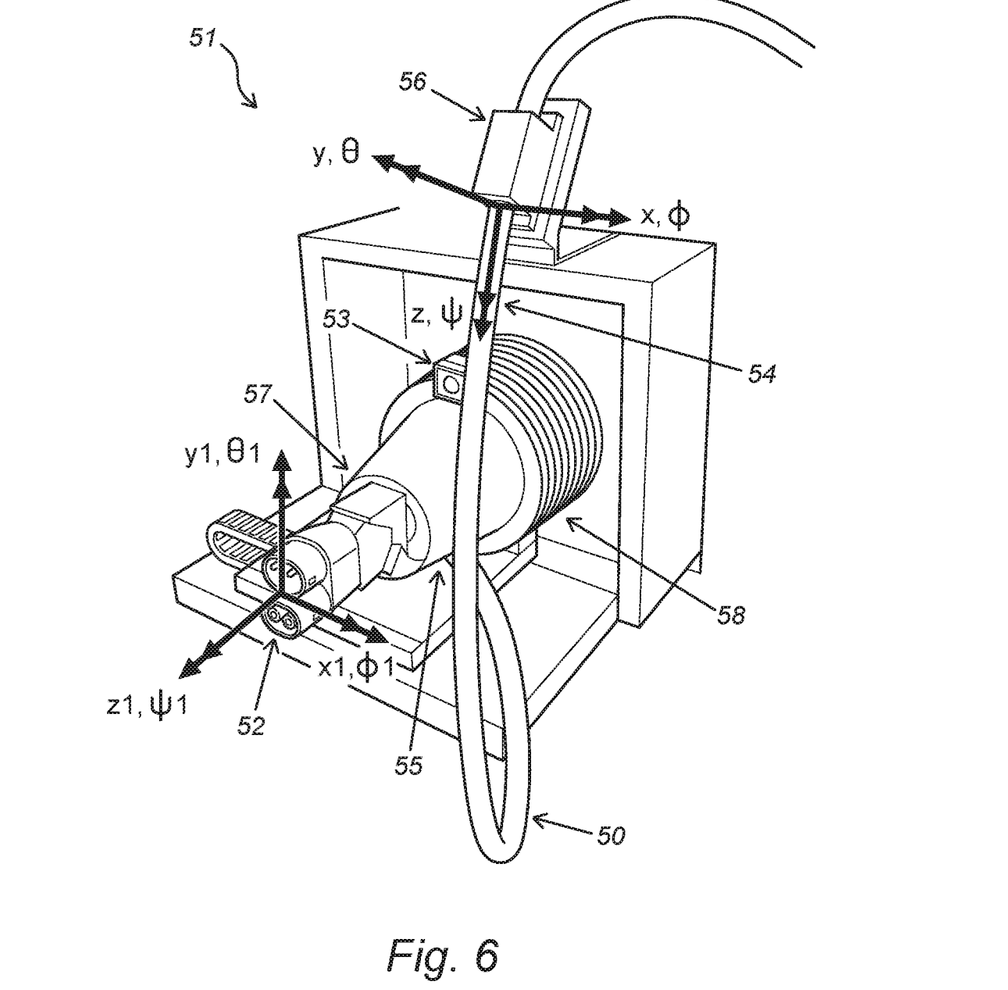
FIG. 6 shows a perspective view of a second detail of various embodiments of the present invention.

FIG. 6 shows a device 51 for positioning a charger connector 52 relative to a vehicle contra connector (not shown), comprising a suspension for a charging cable assembly 54, connected at one end 55 to the charger connector 52, the suspension comprising a first suspension point 56, for clamping, at a point remote from the one end 55, the charging cable assembly 54 in a predetermined orientation and position, which orientation and position together with the rigidity of the cable assembly 54 and the gravity acting on the cable assembly define a preferred position and/or a preferred orientation of the one end 55, and a second suspension point 57, for engaging the charging cable assembly 54 at the one end 55 of the charger connector wherein the second suspension point 57 comprises a manipulator 58 for manipulating the position and/or the orientation of the charger connector relative to the fixed world, in a range around the preferred position and/or the preferred orientation of the one end of the cable assembly 54. The device further comprises a camera 53. In FIG. 6 it is visible that between the first suspension point 56, that clamps and therewith fixates the cable assembly 54 according to positions x, y, z and angles $\varphi$, $\theta$, $\psi$, and the second suspension point 57, at which the cable assembly is held in position x1, y1, z1 and preferred orientation $\varphi$1, $\theta$1, $\psi$1, the cable assembly makes a winding that makes a three dimensional loop or curl.

The above described embodiments are examples only and do in no sense limit the scope of protection as defined by the following claims.

The preferred position may be determined by means of a force and/or moment sensor attached between the one end and the fixed world to measure forces and/or moments acting on the one end required to keep the one end near an equilibrium position and defining the preferred position and/or orientation as the position and/or orientation wherein the average force or moment required to move the one end from an equilibrium position is or is within a predefined distance from the position where the lowest average force or moment required. Preferably the preferred position and orientation are determined such that this average force is 0. The device according to the invention may then be positioned such that the preferred position and orientation are in the vicinity of an expected engagement point of the vehicle.

In other words, the preferred position may be determined by means of a force/moment sensor attached between the one end and points on the fixed world, to determine (the vicinity to) a stable or unstable point of equilibrium where the forces and moments acting on the one end are near or at a local minimum.

The invention claimed is:
1. Device for positioning a charger connector, in particular relative to a vehicle contra connector, comprising:
   a charging cable assembly, connected at one end to the charger connector and having a point remote from the one end;

a suspension for the charging cable assembly, the suspension comprising:

a first suspension point, for clamping, at the point remote from the one end, the charging cable assembly in a predetermined position and orientation, a second suspension point, for engaging the charging cable assembly at the one end of the charger connector;

wherein the predetermined orientation and position together with the first suspension point, the rigidity of the charging cable assembly and the gravity acting on the cable assembly define a preferred position and/or a preferred orientation of the one end; and wherein the second suspension point comprises a manipulator for manipulating the position and/or the orientation of the charger connector relative to the fixed world, in a range around the preferred position and/or the preferred orientation of the one end of the cable assembly;

wherein the preferred position and/or orientation is the position and/or orientation or is within a predefined distance from the position and/or orientation wherein the absolute force or moment required to move the one end from an equilibrium position are locally the lowest average force or moment required to move the one end from an equilibrium position, wherein the absolute force is in particular the norm of the six degree of freedom force moment vector;

characterized in that:

the device for positioni onfigured such that in the preferred position and/or the preferred orientation, the charging cable of the charging cable assembly does not or not essentially extend in a vertical downward direction in or at the height of the second suspension point; and the one end remains stable and above ground level when the second suspension point were taken away, or when the second suspension point applies a fraction of the forces and/or moments that are required to hold the cable assembly in a non-preferred position.

2. Device according to claim 1, wherein the charging cable of the charging cable assembly does not or not essentially extend in a vertical downward direction in or at the height of the preferred orientation when the manipulator is not engaged.

3. Device according to claim 1, wherein the manipulator has a displacement stroke with a working range around a central position and/or orientation that coincides with the preferred position and/or the preferred orientation of the at least one end.

4. Device according to claim 1, wherein the manipulator is arranged for making a displacement stroke with a working range around a central position and/or orientation, the central position differs from the preferred position and/or the preferred orientation of the at least one end, in particular such that the difference between the force required to manipulate the one end upward and downward is less than the difference between the force required to manipulate the one end upward and downward in the preferred position and/or orientation.

5. The device according to claim 1, wherein the length of the portion of the cable assembly extending between the first and second suspension point is greater than an absolute distance between the first and second suspension point.

6. Device according to claim 1, wherein the cable assembly has a winding of at least 45 degrees, more preferably at least 90 degrees, more preferably at least 180 degrees, more preferably at least 270 degrees, and even further preferably at least 360 degrees about a substantially horizontal winding axis extending substantially perpendicular to a direction from the first to the second suspension point.

7. Device according to claim 6, wherein the pitch of the winding is at most ten times the cable thickness, preferably at most five times the cable thickness, and further preferably between one and a half and one time the cable thickness.

8. Device according to claim 1 wherein the manipulator comprises an assembly containing a kinematically serial chain of actuators and/or an assembly containing a kinematically parallel chain of actuators, and wherein the forces required to move the one end from the preferred position and/or preferred orientation over the entire range of the manipulator are less than a force range of the manipulator.

9. Device according to claim 8, wherein the charger connector is coupled to the manipulator through a compliance device, and wherein the forces required to move the one end from the preferred position and/or preferred orientation over the entire range of the manipulator is less than a compliance device threshold.

10. Device according to claim 1, comprising a camera for providing a camera image of a location at which a vehicle contra connector is expected, further comprising a control device for manipulating the connector, based on the camera image, to the position of a sensed vehicle contra connector.

11. Device according to claim 1, wherein the first suspension point comprises a clamping device which engages the charging cable assembly over an axial distance of at least 5 cm, preferably at least 10 cm, and further preferably at least 15 cm, in a form-fitting manner.

12. Device according to claim 1, wherein the first suspension point comprises a clamping device which at least partly restricts and preferably completely obstructs the freedom translation and of rotation of the charging cable assembly at the first suspension point.

13. Device according to claim 1, comprising a fixing element, such as a guide or a spring, for adjusting the stiffness of the charging cable assembly, or fixating the charging cable assembly in a certain shape, between the first suspension point and the second suspension point.

14. Device according to claim 1, wherein the first and/or second suspension point are arranged for detachably engaging the charging cable assembly.

15. Device according to claim 1, wherein the first and second suspension point are movable together relative to the fixed world.

16. Electric vehicle charger, comprising a device according to claim 1, a charging cable assembly, for conveying an electric charging current for the electric vehicle, connected at one end to the charger connector and at another end of the charging cable electrically coupled to at least one source, such as an electric converter, to provide a charging current for an electric vehicle.

* * * * *